Figure 1:
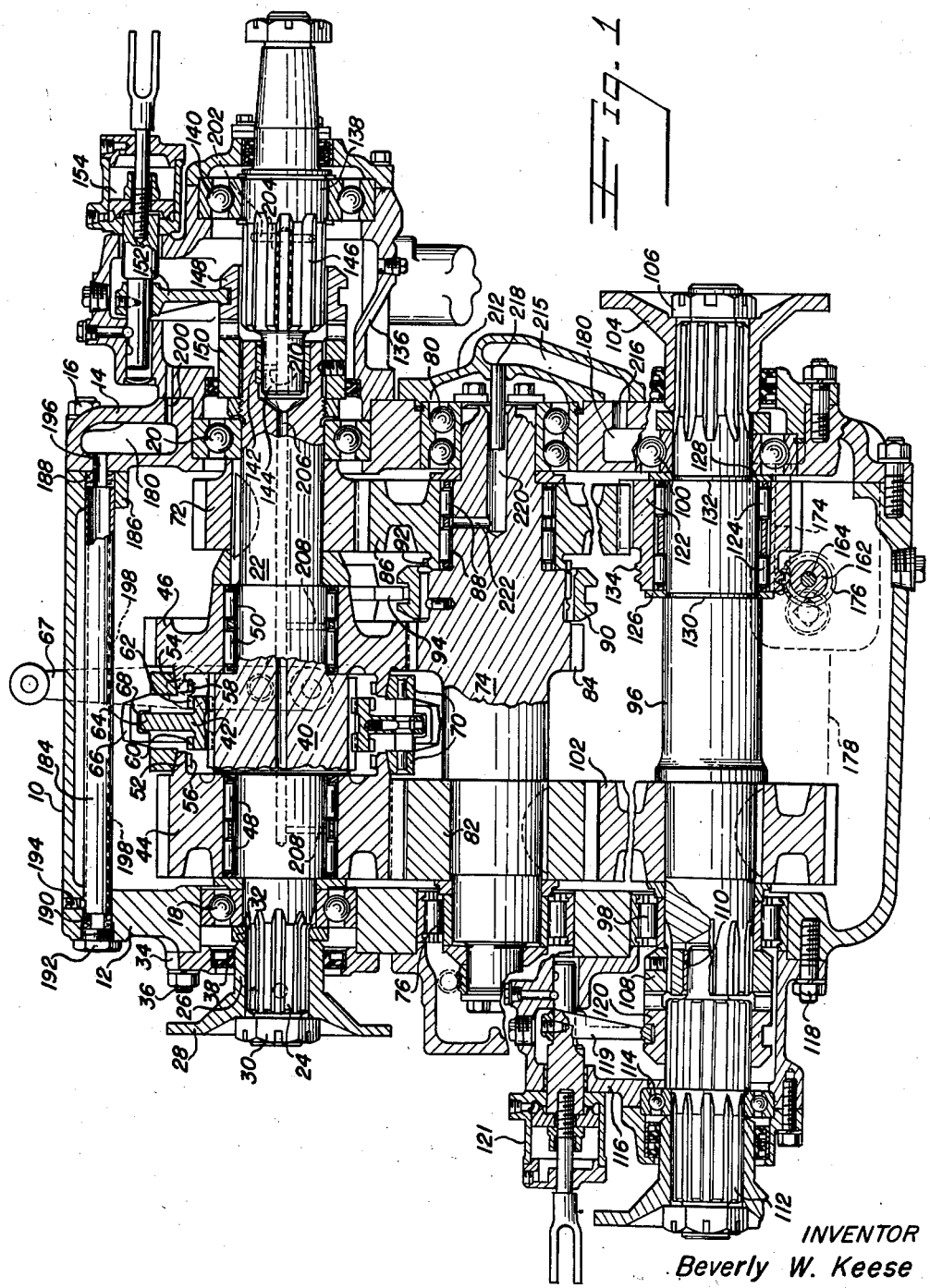

INVENTOR
Beverly W. Keese
By Strauch + Hoffman
Attorneys

April 1, 1952  B. W. KEESE  2,590,870
LUBRICATING MEANS FOR POWER TRANSMITTING MECHANISM
Filed Sept. 30, 1948  2 SHEETS—SHEET 2
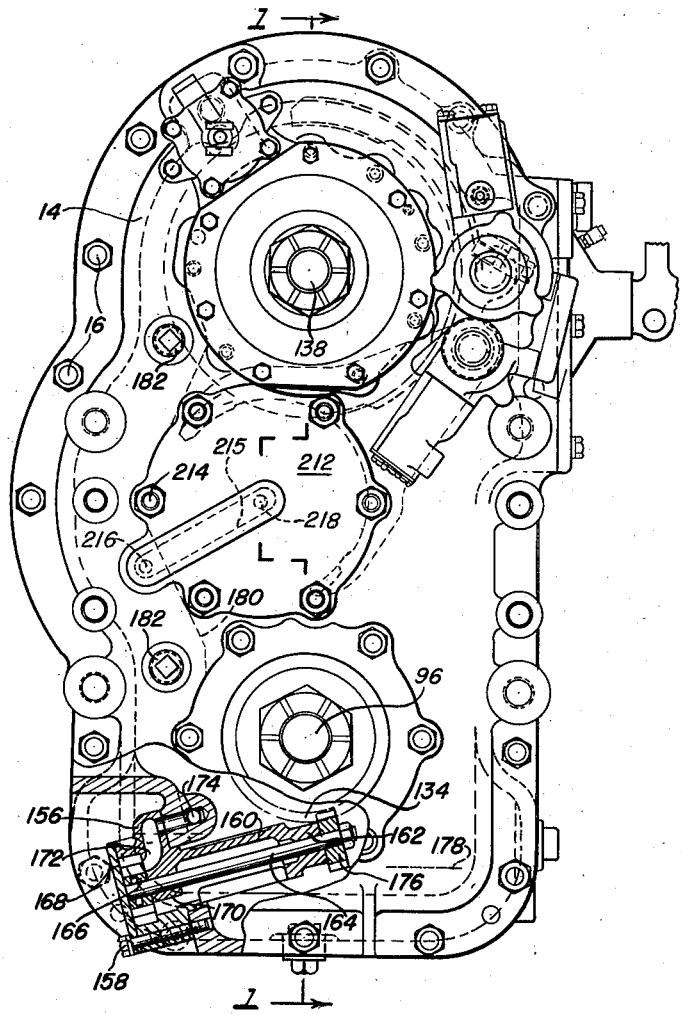
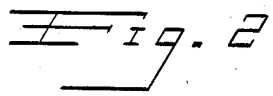
INVENTOR
Beverly W. Keese
By *Strauch + Hoffman*
Attorneys Patented Apr. 1, 1952

2,590,870

UNITED STATES PATENT OFFICE 2,590,870

LUBRICATING MEANS FOR POWER TRANSMITTING MECHANISM

Beverly W. Keese, Oshkosh, Wis., assignor to The Timken-Detroit Axle Company, Detroit, Mich., a corporation of Ohio Application September 30, 1948, Serial No. 51,905

13 Claims. (Cl. 184—6)

This invention relates to lubricating means for power transmitting mechanism and more particularly to force feed lubrication for variable speed transmission mechanism for motor vehicles, of the type disclosed in my pending application Serial No. 631,636, filed November 29, 1945.

As shown in said application, power is transmitted at variable speeds from an input shaft to an output shaft by means of gear elements rotatably journalled on the input shaft and an intermediate counter-shaft and adapted to be selectively coupled in driving relationship with said input shaft. It is the general object and purpose of the present improvements to provide simple and reliably operating means for maintaining a constant supply of lubricating oil under pressure from a sump or reservoir in the bottom of the power transfer case or housing to said gear elements and their journal bearings.

It is another object of the invention to provide a novel mounting and arrangement of the lubricant supply pump on the lower end of the transfer case or housing with drive means therefor mounted on the output shaft for rotation dependently thereof whereby an adequate supply of the lubricating oil may be maintained with a comparatively low level of oil in the sump or reservoir.

It is a further object of the invention to provide a detachable cover member closing one end of the transfer case or housing and provided with a main oil conducting passage connected with the outlet side of the pump.

An additional object of the invention resides in the provision of an oil distributing tube connected to the upper end of the oil passage in the cover member and discharging oil therefrom upon the gear elements journalled on the input shaft.

Another object of the invention resides in the provision of a power take-off unit mounted on the cover member having a shaft axially aligned with the input shaft and shiftable clutch means for releasably connecting said shafts, together with means for supplying lubricating oil from the main passage in the cover member through axial bores in the power take-off shaft and the input shaft to the journal bearings for the gears mounted on the latter shaft.

Still another object of the invention is to provide a cap member for one end of the counter-shaft detachably secured to the cover member and having an oil receiving passage communicating with the passage in said cover member, together with means on the cover member conducting oil therefrom to an axial bore in the counter-shaft from which it is discharged upon the bearings of a gear element rotatably mounted on said shaft.

Another object of the invention is to provide improved lubricating means for power transmitting mechanism as above characterized, and the construction and relative arrangement of the several parts, hereinafter more fully described, illustrated in the accompanying drawings and subsequently incorporated and subjoined claims.

In the drawings, wherein I have shown one simple and practical embodiment of my present improvements, and wherein similar reference characters designate corresponding parts throughout the several views:

Figure 1 is the vertical longitudinal section taken substantially on the line 1—1 of Figure 2; and Figure 2 is an end elevation, partly broken away, and showing one embodiment of the force feed pump mounted on the lower end of the transfer case or housing.

Referring in further detail to the drawings the power transmission gearing to be presently further described is enclosed within a suitable case or housing structure including a body 10 closed at one of its ends by a wall 12 and open at its other end. This open end of the housing body is flanged and closed by the cover member 14 detachably bolted thereto, as shown at 16.

In the upper ends of the housing wall 12 and cover member 14, the anti-friction units, indicated at 18 and 20 respectively, are suitably mounted in which the power input shaft 22 is journalled at its opposite ends. This shaft at one end has a reduced splined extension 24 projecting externally of the housing and upon the same the hub 26 of a universal joint flange 28 is engaged and held against axial movement by means of the nut 30 threaded on the end of said shaft. The drive shaft (not shown) is driven from the engine or motor and connected in the usual manner to the flange 28. The inner end of hub 26 is engaged with a spacing member 32 on shaft end 24 which bears against the inner race ring of the bearing 18. A cap plate 34 closes the outer end of the bearing receiving opening in housing wall 12 and is secured to said wall by bolts 36. This cap plate carries a conventional lubricant seal 38 surrounding the hub 26.

In axially spaced relation from the bearing 18, shaft 22 is formed with a diametrically enlarged section 40 provided with splines slidably engaged by internal teeth on an axially shiftable clutch member 42 surrounding the shaft section 40. At opposite sides of this shaft section, gear elements 44 and 46 of relatively different diameters are rotatably journalled on the input shaft by two anti-friction roller bearings 48 and 50 respectively. Laterally projecting flanges 52 and 54 are formed upon the opposed faces of the respective gears 44 and 46, each of said flanges being provided with internal clutch teeth 56 and 58 respectively for engagement by the spaced rows of external clutch teeth 60 and 62 respectively on the shiftable clutch member 42. This clutch member is centrally formed with an outwardly extending annular flange 64, the outer edge of which is engaged in an internal groove 68 of the clutch shifting fork 66 actuated by lever 67 operatively connected with a remotely controlled actuating unit (not shown).

The flange 64 of clutch member 42 carries a well known type of synchronizing means including the annular members 70 adapted to frictionally coact with the outer inclined peripheral surfaces of flanges 52 and 54 on the respective gear elements 44 and 46 so that in the shifting of the clutch member, the rotative speeds of said member and the gear element on the input shaft are substantially synchronized prior to the effective engagement of the confronting clutch teeth on said member and the gear element.

Between the gear element 46 and shaft bearing 20, a low speed drive gear 72 is keyed or otherwise fixed to the input shaft 22. Below said input shaft, a counter-shaft 74 is journalled at one of its ends in a roller bearing 76 mounted in the end wall 12 of the housing, and at its opposite end in a double row ball bearing 80 mounted in the cover member 14. Direct drive gear 82 is keyed to the counter-shaft 74 and in constant mesh with the gear element 44 on input shaft 22. A relatively small diameter gear 84 is integrally formed with the counter-shaft and in constant mesh with gear element 46 on the input shaft. In spaced relation from the gear 84, a low speed drive gear 86 is rotatably journalled on counter-shaft 74 by the anti-friction roller bearings 88. Between the gears 84 and 86 a clutch collar 90 is slidably splined on the counter-shaft, said collar having internal clutch teeth for engagement with the clutch teeth 92 on gear 86 to drivingly couple said gear to the counter-shaft. The collar 90 is actuated by the shifting fork 94 operated by a remotely controlled fluid pressure actuated unit (not shown), in the manner disclosed in the above mentioned co-pending application.

Below the counter-shaft 74, the power output shaft 96 is journalled at one of its ends in roller bearing 98 mounted in the housing wall 12 and at its opposite end in ball bearing 100 mounted in the cover member 14. Direct drive gear 102 keyed to the power output shaft is constant mesh with gear 82 on the counter-shaft 74. The rear end of shaft 96 projecting beyond cover member 14 carries the universal coupling member 104 connecting the forward end of the conventional propeller shaft with the drive gearing for the rear vehicle axle. Member 104 is secured against axial movement upon shaft 96 by nut 106 threaded on the shaft.

Upon the forward end of the output shaft 96, a clutch member 108 is rigidly secured against rotating or axial movement on said shaft. This end of shaft 96 is recessed to receive a pilot bearing bushing 110 in which the reduced end portion of a drive shaft 112 for the front vehicle axle is journalled. This shaft is also journalled in a ball bearing anti-friction unit 114 suitably mounted in one end wall of a casing 116. This casing is provided with a bolting flange rigidly secured to the end wall 12 of the housing 10 by suitable bolts indicated at 118. Within the casing 116 an axially shiftable clutch collar 120 is non-rotatably splined upon the shaft 112 to coact with the clutch teeth of member 108 and detachably couple the front axle drive shaft 112 with the power output shaft 96. The shifting fork 119 for the clutch collar 120 is operated by a fluid pressure actuated unit 121 mounted on the casing 116, substantially in the manner disclosed in my co-pending application.

A gear 122 in constant mesh with gear 86 on the counter-shaft is rotatably journalled by anti-friction bearing 124 on the output shaft 96, said gear 122 being restrained against axial movement by the collars 126 and 128, the former abutting a shoulder 130 on shaft 96 while the latter is positioned between shoulder 132 on said shaft and the inner race ring of ball bearing 100. This gear 122 is provided with a worm 134 for a purpose which will presently be fully explained.

Upon the upper end of cover member 14 a power take-off unit is rigidly mounted. This unit includes a casing 136 in which power take-off shaft 138 is journalled in ball bearing 140 in axial alignment with the power input shaft 22. The end of shaft 22 is recessed and contains the pilot bearing bushing 142 in which the reduced cylindrical end 144 of shaft 138 is journalled. Between the bearing 140 and input shaft 22, the power take-off shaft 138 has a splined portion 146 non-rotatably engaged by the axially slidably clutch member 148 shiftable into and out of engagement with clutch member 150 fixed on the end of the input shaft 22 to releasably couple said shaft to the power take-off shaft 138. The shifting fork 152 for clutch member 148 is operated by a remotely controlled fluid pressure actuator 154 mounted on casing 136 and is substantially the same as the actuator for the shifting fork of clutch 120 for the front axle drive shaft 112.

The operation of clutch members 42 and 90 for the direct transmission of power torque to output shaft 96 through gears 44, 82 and 102 and for over-drive through gears 46—84 or under-drive through gears 72 and 86 is fully explained in the above mentioned co-pending application, and it will be noted that in all positions of said clutch members rotation is transmitted through gears 72 and 86 to gear 122 and worm 134 whereby the latter will be independently driven relative to the power output shaft 96. Also, power take-off shaft 138 may be releasably coupled with input shaft 22 for operation with the power transmission gearing or independently thereof.

Referring now to Figure 2 of the drawings, to one side of the body 10 of the transfer case or housing at its lower end a constant pressure pump 156 is secured by means of bolts 158. In the present disclosure, I have illustrated a gear pump the body of which includes a head portion bolted to the outer side of the housing wall and the portion 160 extending inwardly and upwardly through an opening in the housing wall. At opposite ends of the body portion 160 of the pump, suitable bearings 162 are provided for the pump shaft 164. Gear 166 fixed to the outer end of shaft 164 rotates in pump chamber 168 between oil inlet 170 communicating with the interior of the housing and the discharge or outlet duct 172 in the pump head which is in communication with a longitudinal passage 174, drilled in the wall of the housing 10. At its inner end, a worm gear 176 fixed to shaft 164 is in constant mesh with worm 134 on gear 122.

The oil level in the bottom of the transfer case or housing, indicated at 178, is comparatively low, the depth of the oil being only sufficient so that the teeth of gear 102 at the lower side thereof will be immersed in the oil.

The cover member 14 at one side of the several shaft elements is cored to provide a vertically extending oil conducting passage 180 which is in communication at its lower end with one end of the pump discharge receiving passage 174 in the housing wall and terminates at its upper end above the input shaft 22. The cover member is provided with a number of vertically spaced filling openings for this passage, normally closed by the plugs 182.

Above the power transmitting gears and clutch means on the input shaft 22 and in parallel relationship therewith an oil conducting tube 184 is supported at one of its ends in an opening in the housing wall 12 and at its other in a boss 186. At its latter end a packing ring 188 is disposed between the end of the tube and cover member 14 and at its other end a similar packing ring 190 is positioned between the end of the tube and the adjustable nut 192. By the adjustment of this nut the packing rings 188 and 190 are compressed and tube 184 is then non-rotatably secured in fixed position by the screw 194 mounted in the wall of housing 10.

The packing ring 188 surrounds one end of a short tube 196 mounted in the wall of cover member 14 through which communication is established between the main oil conducting passage 180 in said member and the interior of tube 184. The wall of tube 184 at the lower side thereof is provided with spaced outlet openings 198 through which oil discharges from said tube directly upon the gear elements 44 and 46 mounted on the input shaft.

Oil is also supplied from passage 180 in the cover member to the clutch means of the power take-off unit, through registering openings 200 in the walls of cover member 14 and casing 136. Some of this oil finds its way through radial ducts 202 to an axial bore 204 in power take-off shaft 138, which is in fluid communication where the axial bore 206 in the power input shaft 22, from which oil discharges through radial ducts 208 to the roller bearings 48 and 50 respectively for the gears 44 and 46. Oil is also supplied through radial ducts 210 from bore 204 in power take-off shaft to the bearing bushing 142 therefor. The bearings 18, 20 and 140 will also be adequately lubricated by the oil supplied through tube 184 and to the interior of power take-off casing 136.

The end of counter shaft 74 which is mounted in cover member 14 and the outer side of bearing 80 are covered by a cap member 212 securely bolted to the cover 14, as shown at 214 in Figure 2 of the drawings. The wall of this cap member is cored to provide a radially extending oil conducting passage 215 communicating at its outer end through opening 216 in the wall of cover member 14 with the main oil conducting passage 180. Oil is delivered from the inner end of passage 215 through a tube 218 on the cover member into an axial bore 220 in the end of counter-shaft 74, from which it is discharged through radial ducts 222 to the roller bearings 88 of gear 86 on the counter-shaft.

The splash of oil in the supply reservoir or sump and that picked up by the gear 102 will maintain the drive gearing for the pump and bearings 80, 76 and 98 in adequately lubricated condition.

From the above description it will be seen that, in either the operative or inoperative condition of the power torque transmitting gearing, while a driving connection is established between the power source and input shaft 22, the pump will be operated to maintain a continuous flow of the lubricant under pressure from the sump or reservoir in the bottom of the case or housing through passages 180 and 215 and tube 184 and its discharge in copious volume directly upon the rotatable gear elements and bearings mounted on the input shaft and the bearings of gear 86 on the counter-shaft. At the same time, lubricant is supplied to the interior of the power take-off unit casing and upon the relatively movable parts of said unit mounted therein. Thus wear of the bearings is reduced to a minimum, and the development of excessive backlash in the operation of the gearing is obviated. By providing the main oil conducting passages 180 and 215 on the detachable cover 14 for the housing and the cap member 212 respectively, production problems are simplified while ready access may be had to said passages without dismounting or otherwise disturbing the lubricant pump. The mounting of the driving worm 134 for the pump shaft on the output shaft 96, independently driven from the low speed gear 86 on the counter-shaft is also an economical feature of the present invention of practical importance. Since the pump operating means is constantly bathed in oil from the sump or reservoir, highly efficient and noiseless operation thereof is assured.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a power transfer unit comprising a housing having vertically spaced power input and output shafts and a countershaft journalled therein and variable speed power transmitting gearing connecting said shafts including spaced gear elements on the input shaft and a low speed gear mounted on an anti-friction bearing on said countershaft; means for circulating lubricant under pressure from a sump in the bottom of said housing comprising a member mounted in the housing above said gear elements on the input shaft for directly discharging lubricant thereon, a pump mounted on the housing in communication with said sump, means drivingly connecting an element of the variable speed gearing with said pump, a first lubricant conducting passage connecting the outlet side of the pump with said member, and an additional lubricant conducting passage connected to said first passage and adapted to directly discharge lubricant upon said anti-friction bearing.

2. In combination with a power transfer unit comprising a housing having a detachable end cover member provided with a vertically extending oil circulating passage and variable speed power torque transmitting mechanism mounted in said housing including a power input shaft and axially spaced gear elements journalled thereon by anti-friction bearings; a power take-off unit detachably mounted on said cover member comprising a casing having a power take-off shaft journalled therein and means for releasably coupling said shaft to the power input shaft, a pump in fluid communication with an oil sump in the bottom of the housing and having its discharge side in fluid communication with the lower end of said oil circulating passage in the cover member, driving connections between the input shaft and said pump, means defining a passage connecting the interior of said power take-off casing with said oil circulating passage in the cover, and means defining a continuously open passage between the interior of said casing and said anti-friction bearings, so that oil is discharged directly on said bearings during operation of said mechanism.

3. The combination defined in claim 2, wherein said continuously open passage comprises axially aligned communicating bores in said shafts and radial oil inlet ducts in the power take-off shaft and radial oil discharge ducts in the input shaft connected with the respective bores.

4. The combination defined in claim 3, together with a pilot bearing member journalling the power take-off shaft at one end for rotation relative to the input shaft, and one of said shafts having additional radial ducts discharging oil from the bore therein to said pilot bearing member.

5. In combination with a power transfer unit comprising a housing having a detachable end cover member provided with a vertically extending oil circulating passage and variable speed power torque transmitting mechanism mounted in said housing including spaced parallel shafts journalled in said cover member and the opposite end wall of the housing, a gear rotatably journalled on one of said shafts by anti-friction bearing means, a pump in fluid communication with an oil sump in the bottom of said housing and having its discharge side connected with said oil circulating passage in the cover member, means drivingly connecting the pump with said gear, and means for conducting oil from said passage in the cover member to said anti-friction bearing means including a cap member for the end of said one shaft detachably secured to said cover member and having an oil receiving passage in direct communication with the passage in said cover member.

6. The combination defined in claim 5, wherein said conducting means further comprises an axial bore in said one shaft and a rigid tubular member carried by said cap member and connecting the passage therein with said bore.

7. The combination defined in claim 5, wherein the pump driving means includes a member directly driven by said gear and rotatably journalled on the other of said shafts.

8. In the combination defined in claim 1, a cap secured to said housing over one end of said countershaft, and said second lubricant conducting passage comprising a passage through said cap connected to said first lubricant conducting passage, an axial bore in said countershaft connected by radial ducts to said anti-friction bearing, and a tube operably connecting the passage in said cap and said axial bore.

9. A transfer case assembly comprising a housing, an engine driven input shaft journaled in said housing, a countershaft journaled in said housing below said input shaft, an output shaft journaled in said housing below said input shaft, an oil circulation pump assembly mounted in the bottom of said housing, and mechanism for continuously driving said pump whenever said engine driven input shaft is rotating comprising a first gear fixed on said engine driven input shaft, a second gear meshed with said first gear and journaled on said countershaft, a third gear journaled on said output shaft and meshed with said second gear, and a drive connection between said third gear and said pump assembly.

10. In the transfer case assembly defined in claim 9, said housing having opposite end walls in which said shafts are journaled, an apertured oil distributor tube in the upper part of said housing extending longitudinally between said end walls, and an oil conducting passage in one of said end walls between said pump assembly and one end of said tube.

11. In the transfer case assembly defined in claim 9, said drive connection comprising a worm on said third gear meshed with a cooperating gear on said pump assembly.

12. A transfer case assembly comprising a housing having opposite end walls, a power input shaft and a countershaft arranged in spaced relation with their ends journaled in said walls, an oil pump in the bottom of said housing constantly drive connected to said input shaft, an oil supply passage in one of said end walls for conducting oil from said pump to the upper part of said housing, a gear journaled on a bearing on said countershaft, a cap on said one end wall covering the adjacent end of said countershaft, and means defining communicating passages in said cap and countershaft between said passage in said one end wall and said bearing for discharging oil under pressure on said bearing.

13. In a transfer case assembly, a housing, an engine driven input shaft journaled in said housing, an oil circulation pump assembly mounted in the bottom of said housing, a power output shaft mounted in said housing below said input shaft, a gear rotatably mounted on said output shaft, a gear fixed on said input shaft connected to continuously drive said gear on the output shaft whenever said input shaft is driven, and a direct gear drive connection between said gear on said output shaft and said pump assembly.

BEVERLY W. KEESE.

REFERENCES CITED

The following references are of record in the file of this patent:

UNITED STATES PATENTS

| Number | Name | Date |
|---|---|---|
| 1,429,466 | Thurnbull | Sept. 19, 1922 |
| 2,328,519 | Wahlberg | Aug. 31, 1943 |